United States Patent

[11] 3,561,570

| [72] | Inventor | Henry L. Sundermann<br>945 S. Holt Ave., Sioux Falls, S. Dak. 57103 |
|---|---|---|
| [21] | Appl. No. | 775,049 |
| [22] | Filed | Nov. 12, 1968 |
| [45] | Patented | Feb. 9, 1971 |

[54] SNUBBER INCLUDING VISCOUS FLUID
2 Claims, 3 Drawing Figs.

[52] U.S. Cl. .................................................. 188/1, 188/87
[51] Int. Cl. .................................................. F16d 63/00

[50] Field of Search .................................... 188/1, 87, 65Consid.

[56] References Cited
UNITED STATES PATENTS
2,961,233 11/1960 Ullrich, Jr. ............... 188/87X
3,035,794 5/1962 Murray..................... 188/87(4X)

*Primary Examiner*—George E. A. Halvosa
*Attorney*—Lucas J. De Koster

ABSTRACT: A fluid-filled flexible tube compressed between at least one roller and another surface. The viscosity of the fluid and the space between the roller and the surface determine the amount of snubbing available.

PATENTED FEB 9 1971 3,561,570

Henry L. Sundermann
INVENTOR.

BY *Lucas J. D Foster*
His Att'y.

SNUBBER INCLUDING VISCOUS FLUID

This invention pertains to means for snubbing motion such as might be applied to a closing screen door, or any other similar installation where it might be desirable to snub the motion. For example, the device could be used in the place of the usual door closers utilizing the viscosity of an oil running through an orifice to provide for the slowing down of a motion. The various machines built around this principal range from relatively simple devices to the very complicated. However, the very simple usually have a relatively short stroke and cannot have a variable speed motion.

Another possible application of my snubber might be in automobile seat belts or shoulder harness where some motion might be permissible, but in which such motion would be quickly snubbed. Such action would greatly reduce impact forces on the user, but would completely retain all benefits.

By my invention, I provide a device which is very simple, inexpensive yet very effective for the purpose. It can be made in various sizes and can provide for very long as well as very short strokes and for variable speeds throughout the stroke.

A more complete understanding of my invention may be had from a study of the following specification and the FIGS. in which.

Briefly my invention comprises a fluid-filled flexible tube adapted to be pulled between a roller and another surface or between two rollers. The spacing between the roller and other surface and the viscosity of the fluid determine the speed at which the tube can be moved and therefore the amount of snubbing applied.

More specifically and referring to the FIG. I have shown my invention in two embodiments adaptable to various uses. The first is probably best adapted to such things as auto seat belts or shoulder harnesses. However, it may readily be adapted to other uses.

Figure 1:
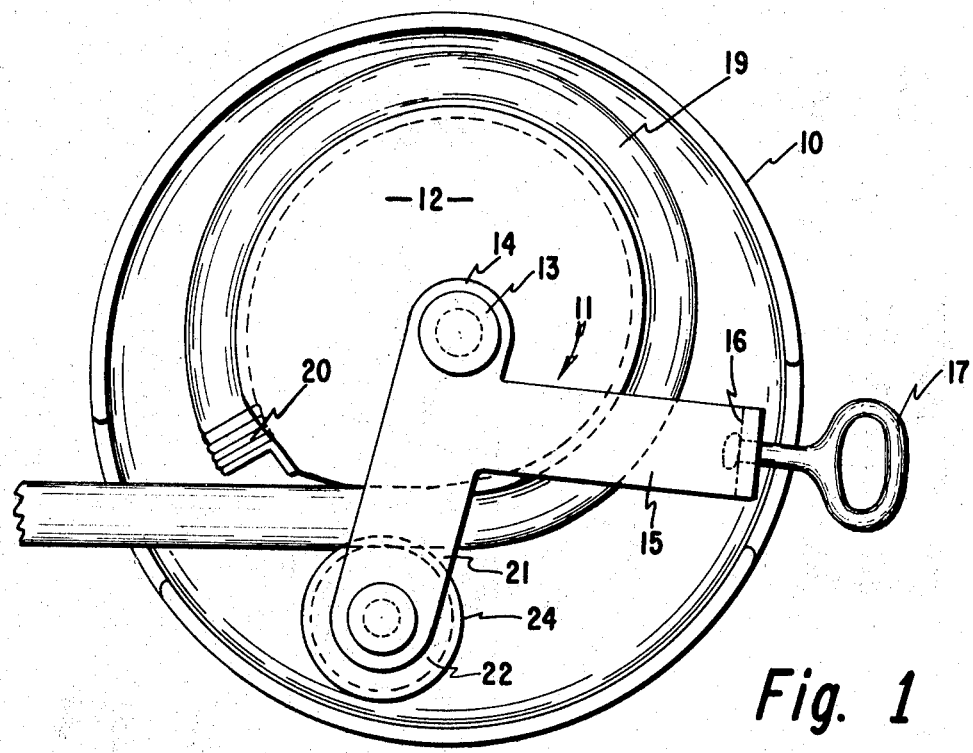
FIG. 1 is an end view of my invention as applied to a device having rotary motion.

As shown in FIG. 1, the device is enclosed in a housing 10 which may be merely a shell as shown or might be a structural part, replacing the yoke, as will appear shortly. It will also be obvious that the open end as shown could be enclosed by a cover. The yoke 11 is a forked member adapted to embrace a rotor 12 which is journaled on an axle 13 held in ears 14 on the yoke. One set of arms 15 extends outwardly and is joined by a cross member 16. An anchor 17 by which the entire device may be fixed to the automobile frame or the like is fastened to the cross member 16.

As shown in the illustration, the rotor 12 is not a simple circle, but is an eccentric. The exact shape is not vital to the operation of the device but may be varied according to the amount of retardation desired at any particular point of travel. A flexible tube or hose 19 having its end tightly closed by a plug 20 is securely fastened to the rotor. This tube is filled with a more or less viscous fluid and is also sealed at its opposite end. That opposite end of the tube may be fastened to a belt or harness or other moving device.

The yoke 11 also includes a second pair of arms 21 between which is journaled a roller 22. This roller is positioned so that it barely touches the outer surface of the tube 19 at the initial point. However, as the tube is pulled out, the rotor 12 moves under the roller 22, and if the tube is squeezed between the rotor 12 and roller 22, the viscous fluid must find its way from the portion of the tube still on the rotor to the portion of tube pulled off the rotor through a decreasing cross-sectional opening in the tube. Thus, the flow of the fluid through the smaller opening in effect becomes a flow through a variable orifice. This flow results in a variable rate of snubbing. It will be obvious that the rotor can be formed in any of several ways to provide variable snubbing rates. For instance, on a seat belt, this orifice could gradually decrease to substantially nothing so that there would be a positive stop. However, on a door closer, the orifice could taper down considerably and then be completely relieved to allow a slight amount of quick motion to provide for latching the door. Various other ideas will undoubtedly occur to others skilled in the art.

It might be desirable to provide flanges 24 on the roller 22 and a groove 25 or the like on the rotor 12 to hold the tube 19 in place. These could also be proportioned to become engaged to provide the positive stop at a certain point in the travel of the device. Problems have been incurred with ballooning of the tube when the orifice is reduced to nothing, and an engagement of the solid materials to provide positive stopping seems desirable.

Figure 2:
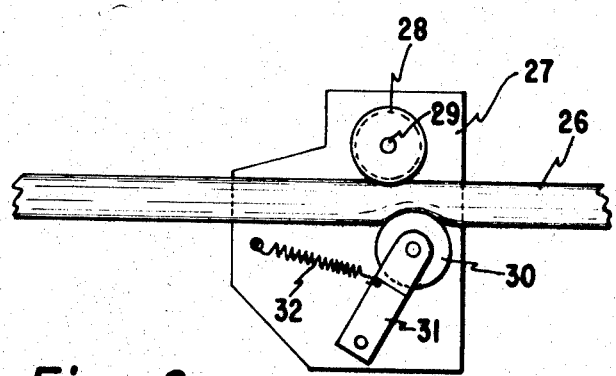
FIG. 2 is a view showing my invention as utilized by a device having a straight line movement.
Figure 3:
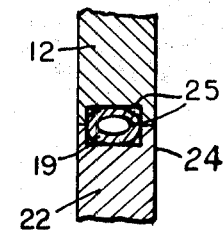
FIG. 3 is a partial sectional view of the rollers and tube separated from other parts showing the fully collapsed position.

An alternative embodiment is shown in FIG. 2. This embodiment is usable, where snubbing is desired, of motion in one direction but not in the other. Again, the tube 26 filled with the viscous fluid is used. Although not shown, it will be obvious that both ends of the tube must be completely closed since the snubbing action is caused by the flow of the fluid from one part of the tube to the other.

A plate 27 is provided on which is journaled a roller 28 on a fixed axle 29. This roller is in position to engage one side of the tube. On the opposite side of the tube, I provide a mobile roller 30 mounted on a carrier 31. This carrier is pivotally mounted on the plate so that the roller 30 will press against the tube opposite the first roller. A spring 32 may be used to hold the roller 30 in light engagement with the tube.

It will be apparent that as the attempted speed of the tube 26 is increased (from right to left in the illustration) there will be added pressure pulling the roller 30 against the tube 26 with a corresponding decrease in the orifice in the tube. Thus there will be added snubbing as the force and speed increase. Reversal of the motion will completely release the roller 30 from any compressing engagement and allow much quicker motion in that direction. Thus, the motion in one direction, but not in the other is effectively snubbed. It will be obvious that if snubbing were desired for motion in both directions, the roller 30 could also be fixed in place and the snubbing would act in both directions. Other variations will undoubtedly be apparent to those skilled in the art.

I claim:

1. A snubber comprising a flexible tube filled with a viscous fluid, means for collapsing said tube including a roller having a fixed position laterally of said tube on one side thereof, a rotor of irregular shape on the opposite side of said tube, said tube being carried on the periphery of said rotor into engagement with said roller, said rotor being shaped to provide varying amounts of collapse of said tube as said tube moves past said roller.

2. The device of claim 1 in which both said roller and said rotor are formed with flange means, said flange means being positioned to engage each other at the end of the desired motion to provide positive stop means.